United States Patent [19]

Morisawa et al.

[11] 4,216,681

[45] Aug. 12, 1980

[54] APPARATUS FOR ADJUSTING THE SLIDE STROKE OF A PRESS MACHINE

[75] Inventors: Kazuo Morisawa, Komatsu, Japan; Rudolf Nägele, Waldstetten, Fed. Rep. of Germany

[73] Assignee: Kabushiki Kaisha Komatsu Seisakusho, Tokyo, Japan

[21] Appl. No.: 974,247

[22] Filed: Dec. 29, 1978

[51] Int. Cl.² .............................................. G05G 1/00
[52] U.S. Cl. ................................................. 74/571 M
[58] Field of Search ............. 74/571 R, 571 M, 571 L

[56] References Cited

U.S. PATENT DOCUMENTS

| 421,297 | 2/1890 | Mills | 74/571 R |
|---|---|---|---|
| 2,892,360 | 6/1959 | Ill | 74/571 |
| 3,402,621 | 9/1968 | Johnson et al. | 74/571 |

*Primary Examiner*—Kenneth Dorner

[57] ABSTRACT

An apparatus for adjusting a slide stroke of a press machine comprising a press frame, a spindle rotatably mounted on the press frame, a first eccentric drum fixedly mounted on the spindle, a second eccentric drum rotatably mounted on the first eccentric drum, a connecting rod rotatably mounted on the second eccentric drum and a slide connected with the second eccentric drum through a plunger. A cylindrical member is rotatably and slidably mounted on the spindle and is adapted to be selectively connectible with the first eccentric drum. The cylindrical member is connected so as to rotate along with the second eccentric drum via a plate member which is rotatably mounted on the spindle and is adapted to slide within a guide groove formed in the second eccentric drum. The slide stroke is adjustable by rotating the second eccentric drum relative to the first eccentric drum.

4 Claims, 3 Drawing Figures

APPARATUS FOR ADJUSTING THE SLIDE STROKE OF A PRESS MACHINE

BACKGROUND OF THE INVENTION

This invention relates to an apparatus for adjusting the slide stroke of a press machine.

As for the slide stroke adjusting apparatus of the kind specified, a mechanism has heretofore been employed which comprises an eccentric drum fitted from the outside to eccentric part of an eccentric shaft, and a connecting rod fitted from the outside thereof to said eccentric drum, said connecting rod being operatively connected to the slide, thereby permitting said eccentric drum to rotate relative to said eccentric part.

Such construction enables the stroke of the slide to be adjusted as desired because of a difference in the upward and downward strokes of the connecting rod when the eccentric drum is rotated relative to the eccentric part; however such conventional stroke adjusting apparatus has been disadvantageous in that it is complicated in structure and requires troublesome stroke adjusting operations.

SUMMARY OF THE INVENTION

It is therefore an object of the present invention to provide an apparatus for adjusting the slide stroke of a press machine wherein the slide stroke can be easily changed or adjusted.

Another object of the present invention is to provide an apparatus for adjusting a slide stroke of a press machine wherein the slide stroke can be changed smoothly.

In accordance with an aspect of the present invention, there is provided an apparatus for adjusting a slide stroke of a press machine comprising a press frame; a spindle rotatably mounted on said press frame; first eccentric drum means fixedly mounted on said spindle, said first eccentric drum means having first serrations formed at one end thereof; second eccentric drum means rotatably mounted on said first eccentric drum means, said second eccentric drum means having a guide groove formed therein at one end thereof; connecting rod means rotatably mounted on said second eccentric drum means, said connecting rod means being adapted to convert the rotary motion of said second eccentric drum means into a linear motion; plunger means connected with said connecting rod means and adapted to move vertically with the rotation of said spindle; a cylindrical member rotatably and slidably mounted on said spindle, said cylindrical member having second serrations formed at one end thereof and adapted to be connectible with said first eccentric drum means by engaging the first and second serrations; plate means rotatably mounted on said spindle and adapted to slide within the guide groove of said second eccentric drum means, said plate means being connected so as to rotate along with said cylindrical member; means mounted on said spindle for selectively connecting and disconnecting said cylindrical member with and from said first eccentric drum means; and means for rotating said cylindrical member when said cylindrical member is disconnected from said first eccentric drum means.

The slide stroke can be changed by rotating said second eccentric drum means relative to said first eccentric drum means. This is because the distance between the central axes of said spindle and said second eccentric drum means in the vertical direction can be changed by rotating said second eccentric drum means relative to said first eccentric drum means.

The above and other objects, features and advantages of the present invention will be readily apparent from the following description taken in conjunction with the accompanying drawings.

DETAILED DESCRIPTION OF THE INVENTION

Figure 1:
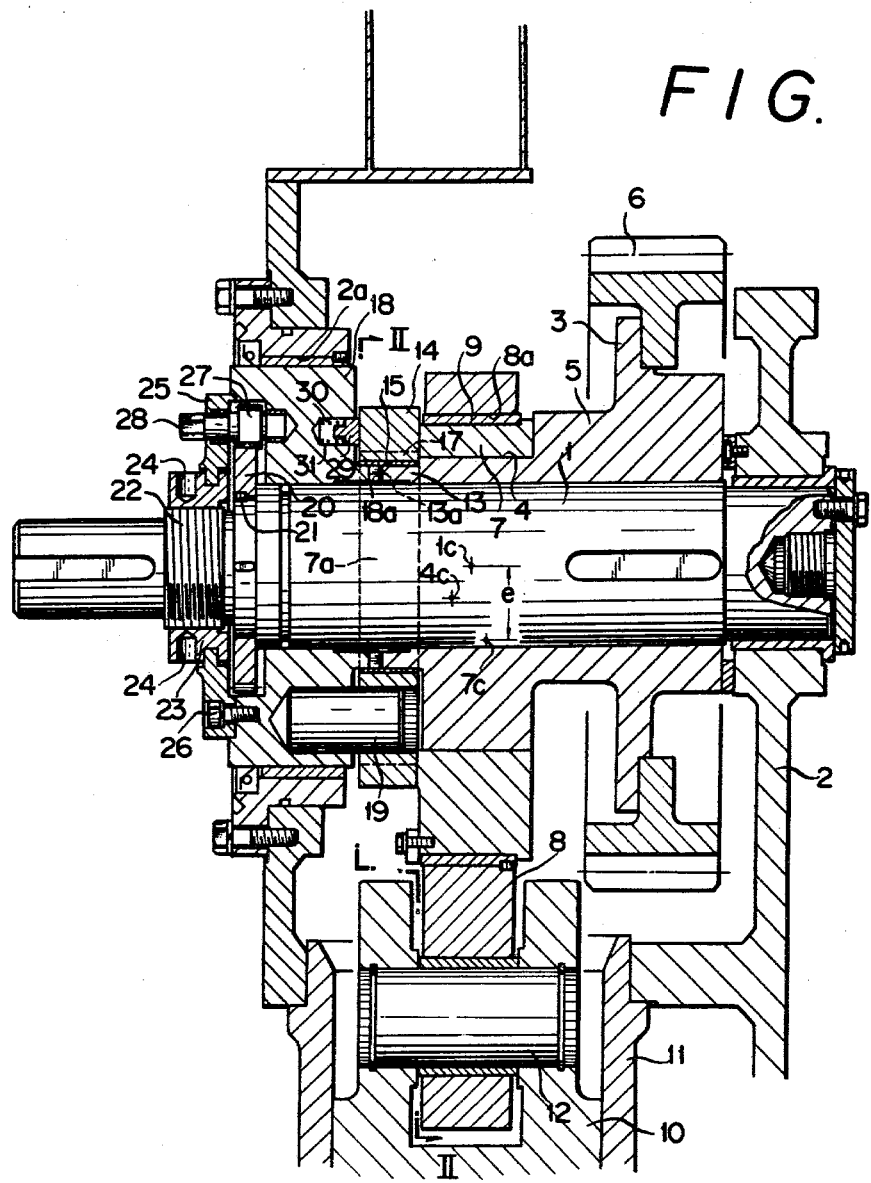
FIG. 1 is a longitudinal cross-sectional view of the present invention.
Figure 2:
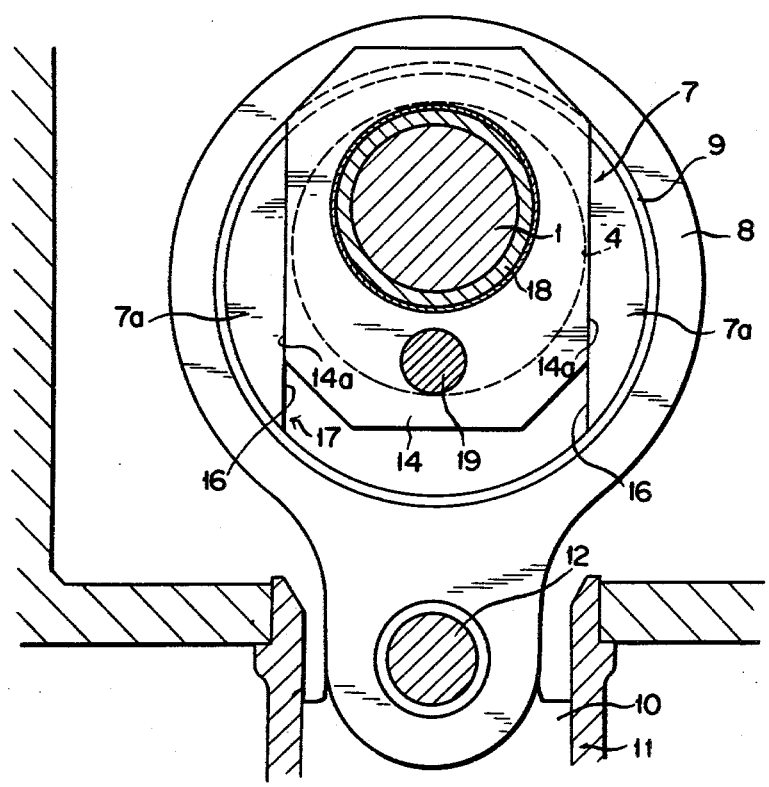
FIG. 2 is a cross-sectional view taken along the line II—II in FIG. 1.
Figure 3:
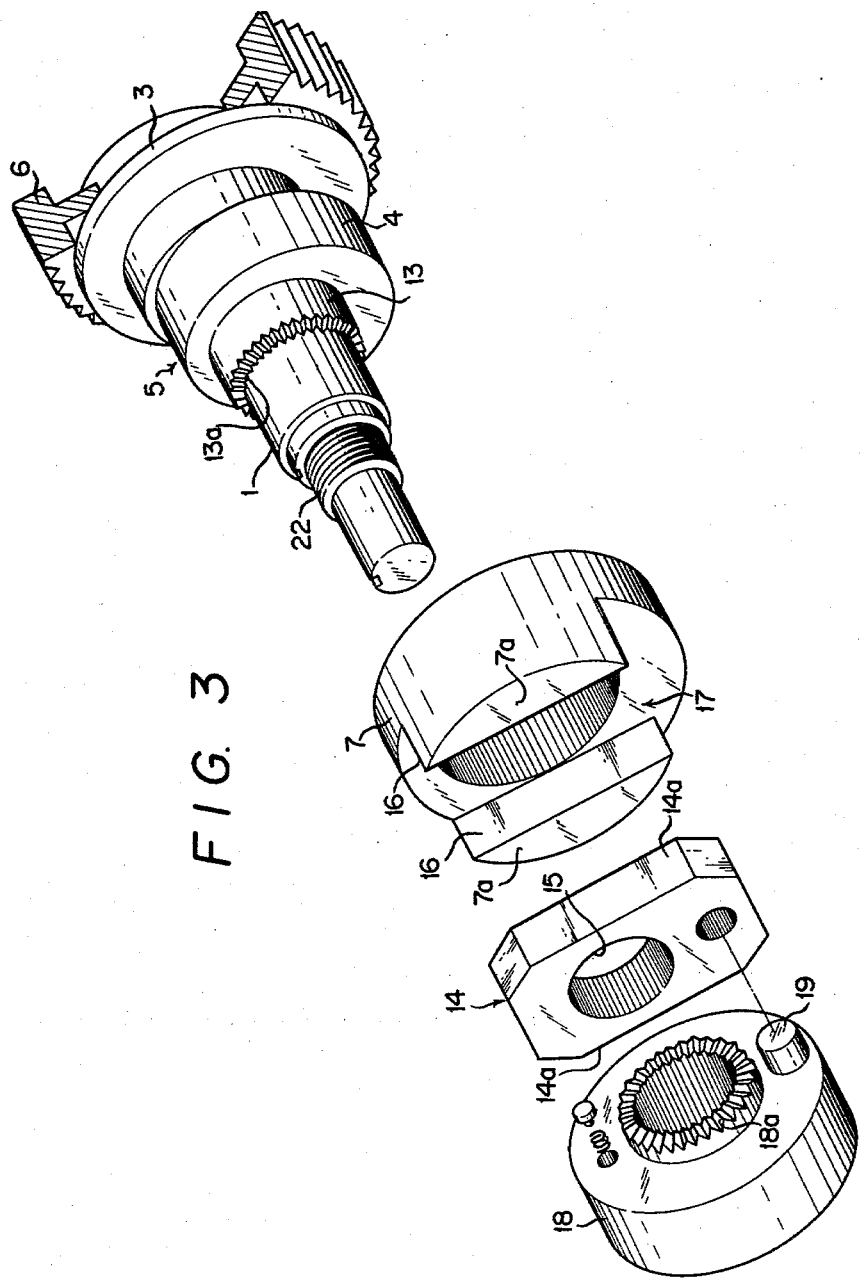
FIG. 3 is an exploded perspective view showing main component parts of the present invention.

The present invention will now be described below by way of embodiment with reference to the accompanying draiwngs.

Reference numeral 1 denotes a spindle rotatably mounted on a press frame 2. Reference numeral 5 indicates a first eccentric drum which is fitted from the outside to the spindle 1 and which has a flange 3 and an eccentric part 4. A gear 6 is fixedly secured to the flange 3, and a second eccentric drum 7 is fitted from the outside to the eccentric part 4. A large diameter bore 8a of connecting rod 8 is rotatably fitted from the outside to the eccentric drum 7 through a bushing 9. Pivotally mounted by a pin 12 on the lower end of the connecting rod 8 is a plunger 11 which is carried within a plunger holder 10, and the plunger 11 is connected with a slide not shown.

Formed as an integral part on one end of the eccentric part 4 of the above-mentioned first eccentric drum 5 is an annular projection 13 which is concentric with the spindle 1 and to which is rotatably fitted from the outside a hole 15 of an adjusting plate 14. The adjusting plate 14 is of a rectangular shape and has end faces 14a, 14a which are vertically slidably inserted within an extending guide groove 17 which is defined by inner faces 16, 16 of a pair of projecting portions 7a, 7a, said projecting portions extending axially and as an integral part of one end of the second eccentric drum.

Reference numeral 18 denotes an annular member adapted to be axially slidably and rotatably mounted on the spindle 1 and within a bore 2a formed in the press frame 2. The annular member 18 is connected with the adjusting plate 14 by means of an axially located pin 19 to each other in the direction of rotation thereof, and the annular member 18 and annular projection 13 have serrations 18a and 13a respectively, which are formed on the respective opposite faces thereof and which are adapted to be engaged with each other.

Fitted from the outside and fixedly secured by means of a key 21 to one end of the spindle 1 is a gear 20, and also formed in the portion of the spindle 1 extending outwardly from the gear 20 is a screw thread 22 which is threadably engaged with a nut 23.

The nut 23 has a plurality of radially extending holes 24 which are formed at predetermined space intervals in the circumferential direction thereof. A plate 25 is fitted from the outside to the nut 23 so that it can be rotated freely and cannot be moved axially. The plate 25 is fixedly secured to the annular member 18 by tightening up a bolt 26.

Reference numeral 27 denotes a pinion which is rotatably mounted on the plate 25 and annular member 18 and which meshes with the afore-mentioned gear 20 and includes an outwardly projecting hexagonal portion formed as an integral part thereof.

Reference numeral 29 indicates a pusher member adapted to be inserted in a bore 30 formed in the annular member 18 and which is biased by a spring 31 on the side of the adjusting plate 14 so as to permit the sliding movement of the annular member 18 to the left hand in the drawing.

Now, the operation of the apparatus of the present invention will be described below.

When it is desired to operate the press machine, the nut 23 is screwed in with the screw threaded part 22 of the spindle 1 so that the annular member 18 may be slidably moved rightwards through the plate 25 so as to engage the serration 18a with the serration 13a thereby connecting and fixedly securing the annular member 18 and the first eccentric drum 5 in the direction of rotation thereof.

Under such condition, if the first eccentric drum 5 is rotated through the gear 6, the annular member 18, the adjusting plate 14 and the second eccentric drum 7 are all rotated as an integral unit. Consequently, the connecting rod 8 is permitted to move vertically by an amount corresponding to the distance between center 1c of the spindle 1 and center 7c of the second eccentric drum 7 which is referred to as eccentricity "e" so that the slide can be moved vertically by the stroke equal to the eccentricity.

When it is desired to adjust the stroke of the slide, the nut 23 is loosened and the annular member 18 is slidably moved leftwards in the drawing so as to disengage the serration 18a from the serration 13a thereby enabling the annular member 18 and first eccentric drum 5 to be disconnected in the direction of rotation thereof.

Under such condition, a tool such as wrench or the like is engaged with the hexagonal part 28 so as to rotate the pinion 27 thereby. With the rotation of the pinion 27 the gear 20 tends to rotate, but cannot rotate because it is fixedly secured to the spindle 1 and the spindle 1 is fixed by braking, and therefore the pinion 27 is rotated around the gear 20 while it is rotated on its axis.

As a result, the annular member 18 can be rotated around the spindle 1.

The rotation of the annular member 18 is transmitted through the connection pin 19 to the adjusting plate 14 so that the adjusting plate 14 is permitted to rotate while it is slidably moved along the guide groove 17 of the second eccentric drum 7 thereby rotating the second eccentric drum 7 around the eccentric part 4 of the first eccentric drum 5.

With the rotation of the second eccentric drum 7, its center 7c is moved upwards and so the vertical distance between the center 1c of the spindle 1 and the center 7c is reduced. In brief, under the condition the center 4c of the eccentric part 4 remains stationary in the vertical direction, the connecting rod 8 is slightly moved upwards.

Under such condition, if the annular member 18 is connected with the first eccentric drum 5 in the direction of rotation in the similar manner as in the aforementioned case and the spindle 1 is rotated through the gear 6, the slide is moved up and down.

In this case, however, since the centre 4c of the eccentric part 4 cannot be moved vertically and the connecting rod 8 has been slightly moved from its initial position, the stroke of the slide will be reduced.

As mentioned hereinabove, the stroke of the slide can be adjusted only by tightening up or loosening the nut 23 and turning the pinion 27, and it is unnecessary to remove any component part so that the operation of the apparatus can be simplified.

Moreover, the manipulation of the nut 23 and the pinion 27 can be made directly from the outside of the press frame or body 2.

Since the present invention is constructed as mentioned above, the slide stroke can be adjusted as will by a simple operation.

While the invention has been described and shown with particular reference to the preferred embodiment, it will be apparent that variations might be possible which would fall within the scope of the present invention, which is not intended to be limited except as defined in the following claims.

What we claim is:

1. An apparatus for adjusting the slide stroke of a press machine comprising a press frame;
    a spindle rotatably mounted on said press frame;
    first eccentric drum means fixedly mounted on said spindle, said first eccentric drum means having first serrations formed at one end thereof;
    second eccentric drum means rotatably mounted on said first eccentric drum means, said second eccentric drum means having a guide groove formed therein at one end thereof;
    connecting rod means rotatably mounted on said second eccentric drum means, said connecting rod means being adapted to convert the rotary motion of said second eccentric drum means into a linear motion;
    plunger means connected with said connecting rod means and adapted to move vertically with the rotation of said spindle;
    a cylindrical member rotatably and slidably mounted on said spindle, said cylindrical member having second serrations formed at one end thereof and adapted to be connectible with said first eccentric drum means by engaging the first and second serrations;
    plate means rotatably mounted on said spindle and adapted to slide within the guide groove of said second eccentric drum means, said plate means being connected to said cylindrical member so as to rotate therewith;
    means mounted on said spindle for selectively connecting and disconnecting said cylindrical member with and from said first eccentric drum means; and
    means for rotating said cylindrical member when said cylindrical member is disconnected from said first eccentric drum means.

2. An apparatus as defined in claim 1 wherein said spindle has a screw threaded portion formed thereon adjacent to one end thereof and wherein said first mentioned means is a nut engageable with the screw threaded portion of said spindle.

3. An apparatus as defined in claim 1 or 2 wherein said last mentioned means comprises a gear fixedly mounted on said spindle and a pinion engageable with said gear.

4. An apparatus as defined in claim 3 wherein said last mentioned means further comprises a plate member rotatably mounted on said first mentioned means and fixedly secured to said cylindrical member and wherein said pinion is supported by said plate member and said cylindrical member.

* * * * *